2,819,152
Patented Jan. 7, 1958

2,819,152

PROCESS FOR PRODUCING TITANIUM CARBIDE

Leif Aagaard, Plainfield, N. J., assignor to National Lead Company, New York, N. Y., a corporation of New Jersey No Drawing. Application August 16, 1954
Serial No. 450,234

3 Claims. (Cl. 23—208)

The present invention relates in general to a process for making metalloids and more especially to an improvement in the method of forming a starting composition from which the metalloids may be formed.

An object of the present invention is to provide an improved method for forming a homogeneous mixture of a hydrated titanium compound and carbon particles for use in the preparation of metalloids.

A further object of the invention is to produce a starting composition for the preparation of metalloids by forming a hydrated titanium compound in the presence of carbon.

These and other objects, features and advantages of the invention will be described and explained more fully in the following detailed description of a preferred form of the invention.

In its broadest aspects, the instant invention relates to a starting composition for the preparation of metalloids comprising an intimate mixture of a hydrated titanium compound and carbon particles; and to a method for producing the starting composition by precipitating the hydrated titanium compound in the presence of the carbon particles such that the hydrated titanium compound and carbon particles are joined by a coalescent bond.

As used herein, the term "hydrated titanium compound" shall be understood to denote and to include not only the raw hydrous titanium oxide "pulp," which is formed and precipitated from a salt solution of titanium by hydrolysis, but also modifications thereof, such as, for example, a hydrous titanium phosphate or an alkali altered hydrous titanium oxide.

The raw hydrous titanium oxide is an uncalcined hydrolysate precipitated usually by hydrolysis from a salt solution prepared from an acid digest of a titaniferous material, such as, for example, titaniferous ore, ore concentrates or slags. By way of illustration, the digestion treatment may comprise mixing a titaniferous material with concentrated (93%) sulfuric acid in an amount such that the ratio of acid, calculated as 100% sulfuric acid, to the titaniferous material, on a $TiO_2$ basis, is within the range of from about 1.3 to 1.5 parts acid to one part titaniferous material, and heating the mixture until a reaction sets in and a digestion cake is formed. The digestion cake is then dissolved in water to form a solution to which scrap iron or the like is added to convert the ferric iron values to ferrous iron. The solution is then clarified, filtered, concentrated and crystallized in the manner well-known to the art of pigment manufacture to form a titanium sulfate solution from which the hydrous titanium oxide is precipitated by hydrolysis and thereafter washed.

Although washing serves to remove large amounts of soluble salts and free acid, there is usually some acid present in the form of a basic salt or adsorbed acid which may impair the quality of metalloids to be formed therefrom, and hence the hydrate may be treated with a basic substance, such as the alkaline compounds of sodium, potassium or ammonium to neutralize and/or remove the adsorbed acid. In general, the size of the individual particles, that is to say the crystalloids or groups of crystalloids of precipitated hydrous titanium oxide, is within the range of from about 0.01 to 0.2 micron. For reasons of economy, sulfuric acid solutions of titanium are used in carrying out the process of the instant invention in preference to solutions prepared from hydrochloric acid.

UNALTERED HYDRATE

To prepare the starting composition of this invention using a raw unaltered hydrous titanium oxide pulp, finely divided carbon having a particle size in the range of from 0.005 to 0.01 micron and preferably hydrophilic, is added to a titanium sulfate solution prepared in the manner hereinabove described, prior to hydrolysis, whereupon the mixture is heated and maintained at a temperature within the range of about 100° C. to about 112° C. for about two hours until a major portion of the titanium oxide values in the solution is hydrolyzed and precipitated out as hydrous titanium oxide in the presence of the individual carbon particles. Thereby, the individual particles of hydrous titanium oxide are joined with the individual carbon particles by a coalescent bond to form a uniform intimate mixture of the hydrate and carbon. This mixture is then filtered or otherwise separated from the hydrolysis acid, washed and subsequently dried to provide a starting composition from which metalloids may be formed as described below, the size of the particles of the starting composition being within the range of from about 0.02 to 0.5 micron.

While the procedure described above is satisfactory, improved yields of the hydrate may be obtained by the expedient of adding a nucleating agent to the salt solution at hydrolysis. A typical nucleating agent, sometimes referred to in the art as a yield seed, is that prepared from a titanium sulfate hydrolysate by treatment of the latter with an alkali metal hydroxide, such as sodium hydroxide, to form an alkali altered hydrate of high $TiO_2$ content. The thermal hydrolysis of a titanium salt solution, as hereinabove described, produces a hydrate in the form of metatitanic acid, but it is within the purview of the invention to form the hydrate as orthotitanic acid.

PHOSPHATE ALTERED HYDRATE

Although the hydrous titanium oxides formed from a titanium sulfate solution, as hereinabove described, are highly satisfactory, modified hydrates of titanium may be used. Thus, it is within the purview of the instant invention to prepare a starting composition by mixing a dilute solution of phosphoric acid and a dilute titanium salt solution at room temperature in the presence of finely divided carbon, and then heating the mixture to complete the reaction and form a filterable starting compound comprising individual particles of titanium phosphate joined to the individual carbon particles by a coalescent bond; or by adding phosphoric acid or a soluble phosphate to the unmodified starting compositions hereinabove described, thereby to convert the hydrous titanium oxide component to titanium phosphate in the presence of the carbon.

ALKALI ALTERED HYDRATE

It has been found also that the starting composition of this invention may be formed from a mixture of an alkali altered hydrate and finely divided carbon particles. As used herein, the phrase "alkali altered hydrate" denotes a starting composition which is prepared from an unaltered hydrate, as hereinabove described, by adding thereto an alkali metal hydroxide, such as sodium hydroxide, in much the same way that an alkali metal hydroxide is added to the hydrate to neutralize the sulfate values, except that in this instance sufficient alkali metal hydroxide is added not only to neutralize the sulfate values but to alter the hydrate itself such that upon calcination it will have the characteristics of sodium titanate. As an alternative method for preparing the alkali altered hydrate, the latter may be precipitated, in the presence of finely divided carbon, from a pure titanium salt solution, i. e. one which is free of iron and other impurities.

A feature which is common to each of the above described starting compositions is the step by which intimate contact is achieved between the particles of hydrous titanium oxide and the carbon particles, in each instance the hydrous titanium compound being intimately joined with the individual carbon particles by formation of the hydrate in the presence of the carbon particles.

While the formation of the starting material of this invention by thermal hydrolysis of a sulfate solution in the presence of carbon may be carried out successfully at atmospheric pressure, it has been found that the rate of hydrolysis may be accelerated considerably by carrying out the operation in an autoclave under pressures of the order of from 100–500 lbs. per square inch. Pressure hydrolysis, preferably coupled with agitation, results in a thorough blending of the hydrate and carbon particles in a relatively short time.

To further illustrate this invention, the following examples are given:

*Example I*

To prepare the unmodified starting composition of this invention, a clarified sulfate solution is prepared in a manner well-known in the art, as for example by digesting a titaniferous ore in concentrated $H_2SO_4$ to form a digest cake which is cut with $H_2O$, filtered, clarified, crystallized, and again diluted with $H_2O$ to form a solution having a $TiO_2$ content of about 200 grams per liter. To this solution was added finely divided hydrophilic carbon in an amount which was varied depending upon the type of metalloid to be formed therefrom. Thus, when the solution was to be used to prepare titanium carbide, finely divided hydrophilic carbon was added to the solution in an amount to satisfy the formula:

$$TiO_2 + 3C \rightarrow TiC + 2CO$$

based on the amount of titanium, calculated as $TiO_2$, recovered from the solution.

A solution prepared in the above manner was boiled for about two hours in the presence of 1% yield seed until about 95% of the titanium was precipitated out as a titania hydrate intimately associated with the fine particles of carbon. This starting composition was then separated from the liquid, washed and dried, and subsequently converted to titanium carbide by calcination.

To this end the starting composition was placed in a furnace and calcined at a temperature of about 1650° C. for about two hours in an inert atmosphere. The resulting product comprised a finely divided powder, the size of the particles being from 1 to 10 microns. An analysis of the product showed 80% titanium and 19.5% carbon.

*Example II*

To prepare a titanium boride metalloid a starting composition was prepared substantially in the manner described in Example I except that in this instance finely divided hydrophilic carbon was added to the sulfate solution prior to hydrolysis in an amount to satisfy the formula:

$$TiO_2 + B_2O_3 + 5C \rightarrow TiB_2 + 5CO$$

based on the amount of titanium, calculated as $TiO_2$, recovered from the solution.

To prepare titanium boride from the resulting starting composition, 130 parts, on a weight basis, of boric acid, as $B_2O_3$, were added for every 148 parts of $TiO_2$ in the starting composition, and the mixture was agitated for a sufficient length of time to thoroughly disseminate the boric acid therethrough whereupon the mixture was introduced into a furnace and calcined at a temperature of about 1550° C. for about two hours in an atmosphere of argon.

The resulting product comprised a finely divided powder which analyzed 68.4% titanium and 29.6% boron and had an effective particle size of from 1 to 5 microns.

*Example III*

To prepare a titanium nitride metalloid, a starting composition was formed by the method described in Example I except that in this instance finely divided hydrophilic carbon was added to the sulfate solution in an amount to satisfy the formula:

$$TiO_2 + 2C + N \rightarrow TiN + 2CO$$

based on the amount of titanium, calculated as $TiO_2$, recovered from the solution. The starting composition resulting from hydrolysis of this solution was dried and introduced into a furnace and calcined at a temperature of about 1350° C. for about two hours in an atmosphere of nitrogen. The resulting product comprised a finely divided titanium nitride powder which analyzed 78.6% titanium and 19.4% nitrogen, the size of the particles being from 1 to 15 microns.

*Example IV*

To prepare titanium carbide from a modified starting composition comprising titanium phosphate and hydrophilic carbon, a dilute solution of phosphoric acid (50 grams per liter $P_2O_5$) was added to a titanium sulfate solution (30 grams per liter $TiO_2$), the weight ratio of $P_2O_5$ to the titanium values being 0.6 on a $TiO_2$ basis. The finely divided carbon was added in an amount to satisfy the formula:

$$TiP_2O_7 + 8C = TiC + 7CO + P_2$$

based on the titanium, calculated as $TiP_2O_7$, recovered from the solution. This mixture was heated for one hour at a temperature of about 70° C. and precipitated a starting composition of coalesced titanium phosphate and carbon which, after being dried, was introduced into a furnace and calcined at a temperature of about 1600° C. for about two hours in an atmosphere of argon.

The resulting product comprised a finely divided titanium carbide powder which analyzed 79.1% titanium and 19.3% carbon, the particle size of the product being in the range of from 1 to 10 microns.

*Example V*

To prepare the titanium nitride metalloid from a starting composition of coalesced titanium phosphate and hydrophilic carbon, a starting composition was prepared substantially in the manner described in Example IV except that finely divided carbon was added in an amount to satisfy the formula:

$$TiP_2O_7 + 7C \xrightarrow{N_2} TiN + 7CO + P_2$$

based on the amount of titanium, calculated as $TiP_2O_7$, recovered from the solution. This starting composition was calcined at a temperature of about 1350° C. for two hours in an atmosphere of nitrogen. The resulting product was a finely divided titanium nitride powder of substantially uniform particle size, which analyzed 79% titanium and 21% nitrogen, the particles ranging in size from about 1 to 10 microns.

*Example VI*

To form a titanium boride metalloid, a starting composition of titanium phosphate and hydrophilic carbon was prepared as described in Example IV except that finely divided carbon was added in an amount to satisfy the formula:

$$TiP_2O_7 + 10C + B_2O_3 = TiB_2 + 10CO + P_2$$

based on the amount of titanium, calculated as $TiO_2$, recovered from the solution. For every 148 parts of titanium, calculated as $TiO_2$, in the titanium-phosphate-carbon composition were added 130 parts boric acid as $B_2O_3$. The mixture was thoroughly agitated for a sufficient length of time to form intimate contact of the materials whereupon the mixture was introduced into a furnace and calcined at a temperature of about 1550° C. for about two hours in an atmosphere of argon.

The resulting product comprised finely divided powder which analyzed 68.1% titanium and 29.9% boron, the effective particle size being from 1 to 5 microns.

As mentioned above, the invention also contemplates the preparation of a starting composition comprising a mixture of an alkali altered hydrate and carbon from which the carbide, nitride and boride metalloids may be produced in the manner described above.

One way in which this alkali altered hydrate-carbon starting composition may be prepared is by thermal hydrolysis of a sulfate solution and carbon, in situ, as described in Example I, and then adding to the resulting hydrate-carbon mixture a quantity of an alkali metal hydroxide, such as, for example, sodium hydroxide.

The alkali altered hydrate-carbon starting composition may also be prepared from a pure titanium salt solution, that is to say a solution free of iron, vanadium, aluminum and other impurities. By way of example, finely divided carbon may be added to a pure chloride solution, such as titanium tetrachloride, and to this mixture is added an alkali metal, such as sodium hydroxide, in an amount sufficient both to neutralize the solution and alter the hydrate. The resulting hydrolysate will comprise an admixture of carbon particles, bonded with the particles of alkali altered hydrate from which the soluble salts may be removed by washing prior to calcination.

From the foregoing description and examples it will be evident that the instant invention provides a starting composition for the production of finely divided metalloids, the starting composition being characterized by a coalescent bond between the hydrated titanium compound and carbon such that the metalloids formed therefrom are of high purity and uniform and fine particle size, the methods for producing the starting compositions being characterized by precipitating the hydrous titanium oxide in the presence of the carbon particles, thereby to insure a highly reactive material which may be calcined at relatively low temperatures to form metalloids of superior physical and chemical characteristics.

While this invention has been described and illustrated by the examples shown, it is not intended to be strictly limited thereto, and other variations and modifications may be employed within the scope of the following claims.

I claim:

1. Process for forming a titanium compound of carbon, the steps of: preparing a starting composition by forming a sulfate solution of titanium, hydrolyzing said sulfate solution in the presence of finely divided carbon particles to form a mixture comprising coalesced particles of a hydrated titanium compound and carbon, altering the said hydrated titanium particles of said mixture by treating the latter with an alkali metal hydroxide, such that when calcined said hydrated titanium is converted to an alkali metal titanate, and then calcining the alkali altered mixture to form a finely divided titanium compound of carbon.

2. Process for forming a titanium compound of carbon, the steps of: preparing a starting composition by forming a sulfate solution of titanium, hydrolyzing said sulfate solution in the presence of finely divided carbon particles to form a mixture comprising coalesced particles of a hydrated titanium compound and carbon wherein the ratio of carbon to titanium values calculated as $TiO_2$ is in the range of from 2 to 5, altering the said hydrated titanium particles of said mixture by treating the latter with an alkali metal hydroxide, such that when calcined said hydrated titanium is converted to an alkali metal titanate, and then calcining the alkali altered mixture to form a finely divided titanium compound of carbon.

3. Process for forming a titanium compound of carbon, the steps of: preparing a starting composition by forming a sulfate solution of titanium substantially free of iron values, neutralizing the substantially iron-free sulfate solution by adding an alkali metal hydroxide thereto in the presence of finely divided carbon particles to form a mixture comprising coalesced particles of an alkali altered titanium hydrate and carbon, said hydrate being altered by said alkali such that when calcined said hydrate is converted to an alkali metal titanate, and then calcining said mixture to form a finely divided titanium compound of carbon.

References Cited in the file of this patent

UNITED STATES PATENTS

| | | |
|---|---|---|
| 1,361,866 | Jebsen | Dec. 14, 1920 |
| 1,486,373 | Gerngross et al. | Mar. 11, 1924 |
| 2,515,463 | McKenna | July 18, 1950 |
| 2,733,134 | Aagaard et al. | Jan. 31, 1956 |

FOREIGN PATENTS

| | | |
|---|---|---|
| 522,487 | Belgium | Dec. 16, 1953 |

OTHER REFERENCES

Barksdale: "Titanium," 1949, page 96.